United States Patent [19]

Arcara et al.

[11] 4,375,663
[45] Mar. 1, 1983

[54] POWER FAILURE EARLY WARNING CIRCUIT FOR MICROPROCESSOR WITH CMOS RAM MEMORY

[75] Inventors: Samuel A. Arcara, Telford; Howard S. Hoopes, Hatfield, both of Pa.

[73] Assignee: Leeds & Northrup Company, North Wales, Pa.

[21] Appl. No.: 135,418

[22] Filed: Mar. 31, 1980

[51] Int. Cl.³ .......................... G06F 1/00; G11C 13/00
[52] U.S. Cl. ...................................... 364/200; 365/226
[58] Field of Search ... 364/200 MS File, 900 MS File; 365/226, 227, 228, 229

[56] References Cited

U.S. PATENT DOCUMENTS 4,096,560 6/1978 Footh .................................. 364/200
4,122,359 10/1978 Breikss ........................... 365/229 X

*Primary Examiner*—Raulfe B. Zache
*Attorney, Agent, or Firm*—William G. Miller, Jr.; Raymond F. MacKay

[57] ABSTRACT

A circuit for preventing data transfers to a RAM by a microprocessor when primary ac power fails also puts the RAM in standby after a period adequate to complete any data transfer started. The sequence is provided by providing a first signal to the microprocessor transfer enable line upon loss of primary power. A second signal is provided for the enable line of the RAM after a predetermined delay but before decay of the dc power to the RAM.

2 Claims, 2 Drawing Figures

POWER FAILURE EARLY WARNING CIRCUIT FOR MICROPROCESSOR WITH CMOS RAM MEMORY

BACKGROUND OF THE INVENTION

This invention relates to computer and microprocessor based products and more particularly, to a means for preventing the loss of data from the memory as well as for preventing an erroneous transfer of data to the memory of the product upon a loss of primary power.

In computer and microprocessor based products, it is necessary to store data in a random access memory (RAM). In some cases it is necessary to maintain storage of this data even when power is off so that the data will not be lost and the operating capacity of the unit will be preserved.

One method of storing data while power is off is by the use of CMOS RAM integrated circuits powered from a battery. The CMOS RAM data storage is chosen for some products because its power consumption can usually be made very low for long term data retention. This can be accomplished by providing appropriate signals on certain pins of the integrated circuit devices by means well known to those familiar with this art. The use of the CMOS RAM for data storage, however, introduces some difficulties when it is desired to make sure that the data is preserved during power failures. These difficulties arise mostly because of the necessary sequence of events which must occur in order to preserve the data stored in the CMOS RAM. Thus the microprocessor must be given advance warning that the dc power to the system and particularly to the CMOS RAM is about to fail and that warning signal must occur early enough so that any data transfer that is to be initiated will be finished before the dc supply to the RAM has failed. Also, the RAM device must be put into the "Data Retention" mode to assure that the data is retained when less than the normal supply voltage to the RAM device is available. There must simultaneously be prevented any addressing or writing into the RAM. It will thus be evident that the data retention mode cannot be initiated until it is known that the data transfers that have already been started have been completed, otherwise partial data transfers may occur with the associated errors.

To accomplish the "Data Retention" mode, the RAM power supply must be switched from its normal dc supply which is produced from the ac power to a back-up battery supply which will be adequate to retain the data in the RAM providing ac power is restored within the time period during which the batteries can maintain their charge at a level sufficient to maintain data in the RAM. In addition to the above steps for maintaining data during power failure, it is, of course, necessary that the microprocessor be able to write to the RAM after the power has been returned but not before the RAM is enabled.

The nearest prior art consists of a system which utilizes a voltage comparator connected to the dc supply for the RAM so arranged that the comparator senses when that supply has begun to decay to the value of the ac power supply. Such an arrangement, however, does not always provide adequate time to complete data transfers already initiated as well as to place the RAM in a "Data Retention" mode after data transfers have been completed and can thus lead to incomplete transfers and associated errors that result therefrom.

SUMMARY OF THE INVENTION

There is provided an apparatus for preserving the data in memory and for preventing inaccurate transfers of data to memory in a microprocessor based product having a CMOS random access memory when a loss of primary ac power occurs. This apparatus includes means which are operable in response to the loss of primary power to produce a first signal and means responsive to that signal which will prevent initiation of the transfer of data from the microprocessor to the memory. Means are also provided for producing a second signal on the $\overline{\text{CMOS RAM ENABLE}}$ line of the memory a predetermined time after the first signal for disabling said memory and placing it in standby condition. The predetermined time mentioned is a period which is shorter than the period required for the voltage supply to the microprocessor memory to decay below that value necessary to provide for an accurate transfer to the memory but longer than the period for transfer of a complete block of data.

DESCRIPTION OF THE PREFERRED EMBODIMENTS

Figure 1:
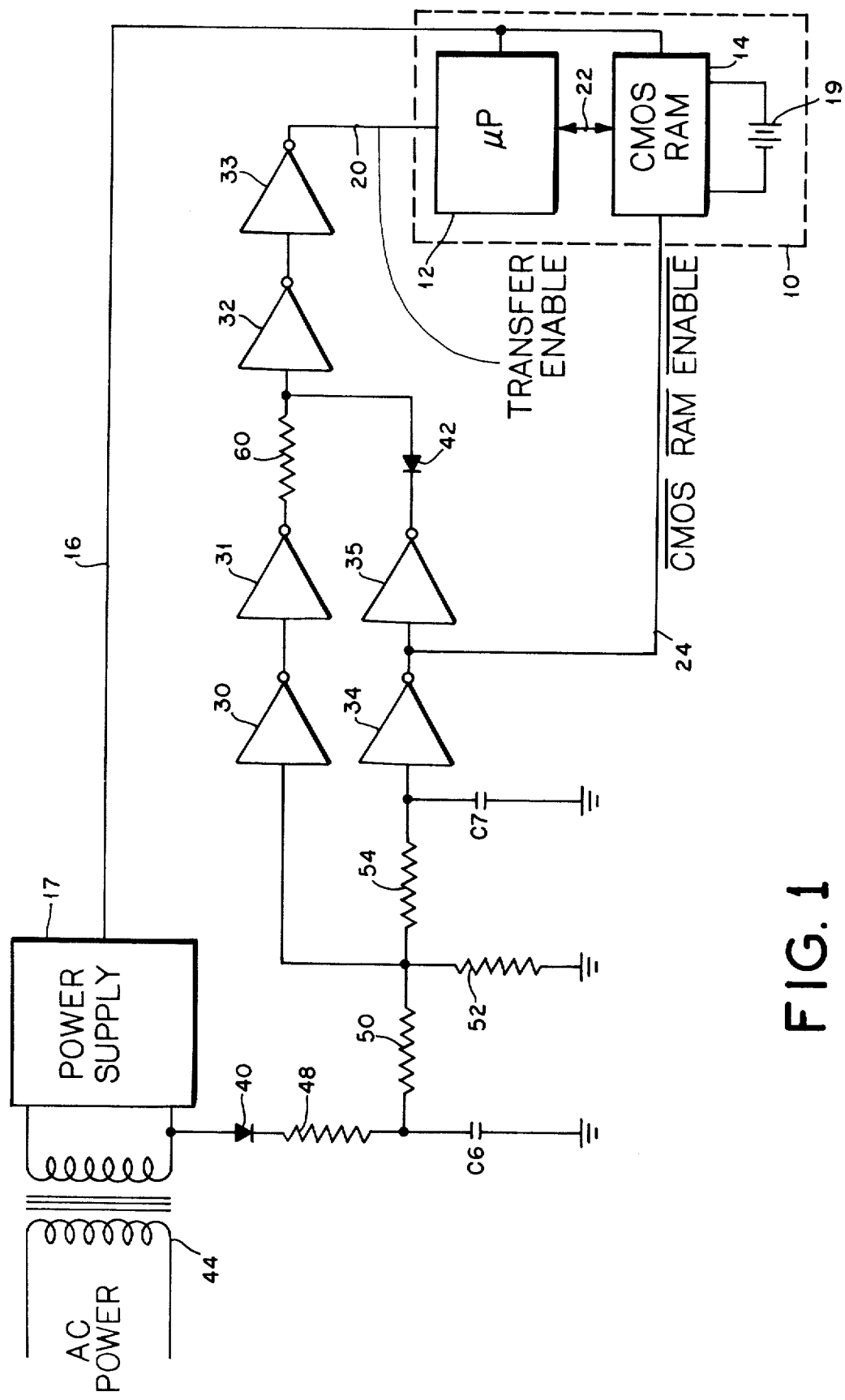
FIG. 1 is a circuit diagram partially in block form which shows a circuit of one form of the invention.

The circuit shown in FIG. 1 provides the necessary time signals for an early shutdown of the microprocessor system shown with its CMOS RAM memory and its battery backup. The microprocessor based product 10 is shown as including a microprocessor 12 and its associated CMOS RAM memory 14. The microprocessor 12 and the CMOS RAM memory are supplied with the required dc power from the power supply 17 over line 16. For the CMOS RAM memory this supply may be, for example, a 5 volt supply as is usually required.

As shown, the microprocessor includes among other signal inputs, some of which are not shown, a signal input on line 20 which is given the name "TRANSFER ENABLE". That signal is polled by the microprocessor each time it is necessary to transfer a block of data to the RAM. If the TRANSFER ENABLE signal is high, the entire block is transferred. If that signal is low, the transfer is prevented.

The CMOS RAM 14 includes not only an input from the microprocessor over line 22 which provides for the transfer of data from the microprocessor to the RAM and from the RAM to the microprocessor, but there is also included as one of the lines to the CMOS RAM a line 24 which is named the $\overline{\text{CMOS RAM ENABLE}}$. The signal on line 24 when low allows normal RAM access and high speed operation when the RAM device is connected to its normal dc supply on line 16 as derived from power supply 17. When this signal is held high, it forces the RAM into the non-addressable "Data Retention" mode. In that mode the supply required may be dropped to a lower dc value such as 2 volts or supplied from battery 19, for example, instead of the 5 volts supplied on line 16. The lower voltage is adequate to maintain data already in the RAM.

As shown, the circuit of FIG. 1 consists of six CMOS inverters with Schmidt Trigger Inputs. These may, for example, be type 74C14. These inverters are identified by the reference characters 30-35. There is also provided two RC timing circuits which are shown as including the capacitors C6 and C7. The circuit also utilizes a half-wave rectifier 40 and a low power logic gating circuit utilizing diode 42 and resistor 60.

Figure 2:
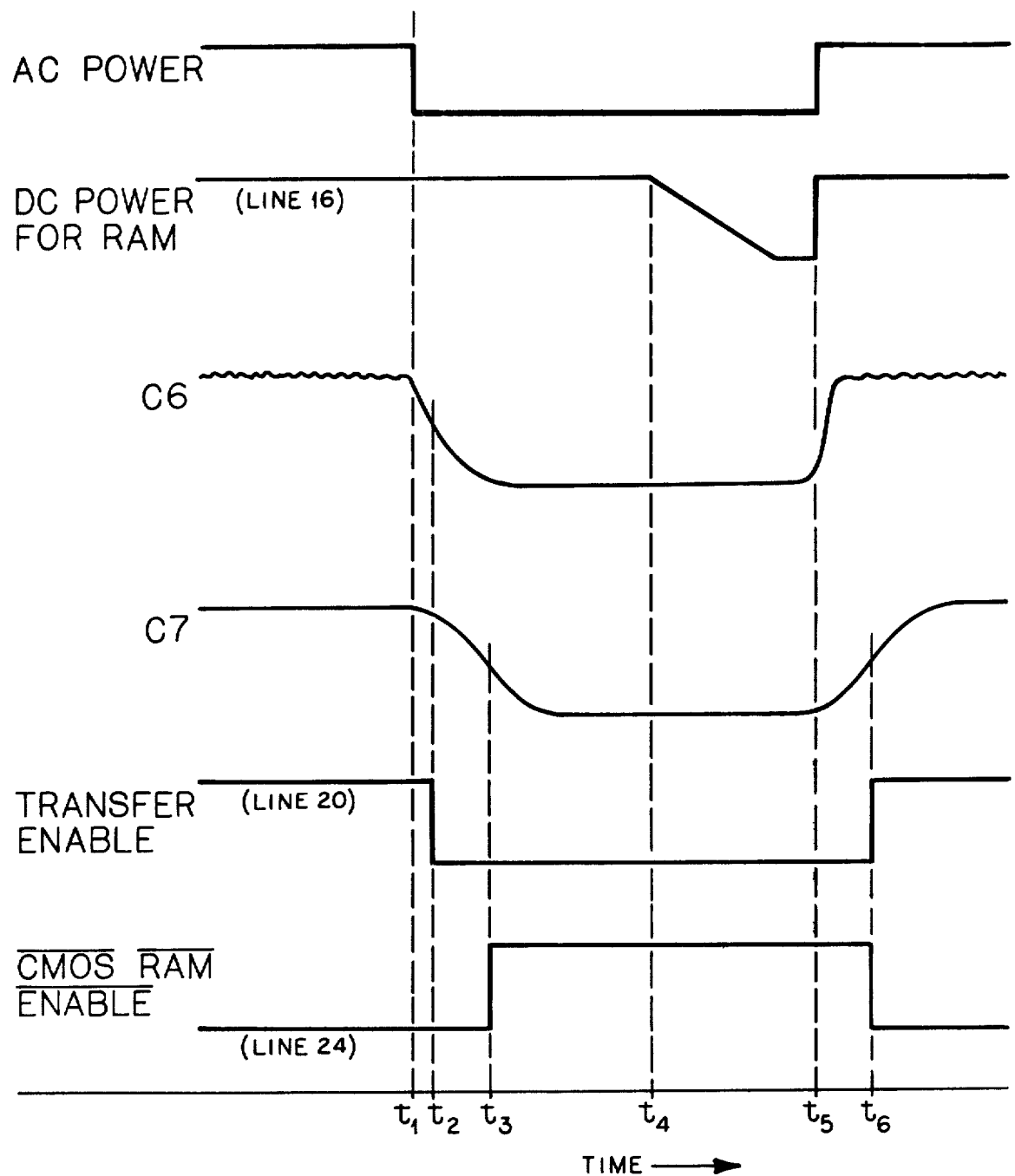
FIG. 2 is a graphical representation of the voltages and signals at certain points in the circuit of FIG. 1.

The operation of the circuit of FIG. 1 will be evident from the following description taken in conjunction with the timing diagram of FIG. 2. As shown in FIG. 1, the primary ac power is supplied by way of transformer 44 to the power supply 17 as well as to the half-wave rectifier 40. When the ac power is "on" the capacitor C6 is charged through rectifier 40, which may be a 1N4004, and resistor 48 which may be 10 ohms, so that the charge on capacitor C6 will reach about 9 volts.

The resistors 50 and 52 with capacitor C6 forms an RC timing circuit whose time constant is about 30 milliseconds when the capacitor C6 has, for example, a value of 0.1 microfarad and resistors 50 and 52 are 100 and 220 kilohms. Likewise, the resistor 54 and the capacitor C7 form an RC timing circuit with a time constant of about 20 milliseconds when the resistor 54 has a value of 220 kilohms and capacitor C7 a value of 0.1 microfarads. These two timing circuits are used in circuit of FIG. 1 to stagger the timing sequence required for the signals to the microprocessor and the CMOS RAM.

When primary ac power fails, for example, at time $t_1$ as shown in FIG. 2, the voltage on capacitor C6 decays as shown in FIG. 2 bringing the inverter 30 through its threshold and consequently causing the TRANSFER ENABLE signal on line 20 to go low at time $t_2$ due to the operation of the intervening inverters 30, 31, 32, and 33 in conjunction with the resistor 60 which may, for example, have a value of 100 kilohms. As mentioned, the TRANSFER ENABLE signal going low will prevent the microprocessor 12 from making any data transfers although it will not prevent the completion of any transfers already initiated.

Approximately 20 milliseconds after the TRANSFER ENABLE signal on line 20 has gone low, the $\overline{\text{CMOS RAM ENABLE}}$ signal goes high due to the timing provided by the resistor 54 and capacitor C7. Thus, the $\overline{\text{CMOS RAM ENABLE}}$ signal goes high at time $t_3$ as shown in FIG. 2 in response to the output signal from the inverter 34. The presence of the $\overline{\text{CMOS RAM ENABLE}}$ signal on line 24 at time $t_3$ places the RAM in standby mode by connecting it to operate from battery 19 and it will be noted that this sequence is completed before the dc supply to the RAM, as shown in FIG. 2, starts to decay at time $t_4$. The delay between $t_1$ and $t_4$ is due to the capacitors in the power supply 17 which will have sufficient charge to maintain the volage on line 16 until time $t_4$. The transfer to standby for the RAM is made possible by the above mentioned sequence of the TRANSFER ENABLE signal going low followed by the $\overline{\text{CMOS RAM ENABLE}}$ signal going high. The transfer of data from the microprocessor to the RAM is then prevented in addition to the placing of the RAM in standby mode before any decay of the dc power supply to the RAM is experienced.

When ac power returns at time $t_5$, as shown in FIG. 2, the capacitor C6 is again charged to approximately 9 volts, for example, and the output signal of inverter 31 goes high. However, the TRANSFER ENABLE signal is held low by virtue of the voltage drop in resistor 60 due to current flow through diode 42 until capacitor C7 charges to the threshold voltage of inverter 34 which causes the $\overline{\text{CMOS RAM ENABLE}}$ signal to go low which causes the output of inverter 35 to go high thus blocking current flow through resistor 60 and diode 42. This keeps the microprocessor from writing to the RAM while the RAM is in a standby mode. It will thus be seen that the circuit of this invention senses a failure of its primary power almost as soon as it occurs and allows adequate time for an early shutdown to occur before the dc supply to the memory has decayed instead of waiting until the dc starts to decay as is the case with the prior art. At the time when the dc to the RAM starts to decay it is already too late to begin a shutdown sequence which will preserve data integrity under all conditions.

What is claimed is:

1. In a microprocessor based product having a CMOS random access memory connected to the microprocessor for storing data and a dc power supply for said microprocessor and memory derived from a primary ac source, apparatus for preserving the data in memory and for preventing incorrect transfers by said microprocessor when there is a loss of primary ac power, comprising:

means operable in direct response to the loss of primary ac power and independent of the dc supply to produce a first signal;

means operable in response to said first signal to prevent initiation of the transfer of data from said microprocessor to said memory; and means directly responsive to the loss of primary ac power and independent of the dc supply for producing a second signal on the $\overline{\text{CMOS RAM ENABLE}}$ line of the memory a predetermined time after said first signal so as to disable said memory and place it in standby condition, said predetermined time being a period which is shorter than the period required for the voltage of the dc supply to decay below that level necessary to provide for correct transfer to memory but longer than the period for transfer of a complete block of data.

2. Apparatus as set forth in claim 1 in which said means operable to produce said first signal includes:

a first capacitor which is maintained charged to a particular voltage by said ac source and which discharges upon loss of power from said ac source, and means responsive to a decay of the charge on said first capacitor to cause the TRANSFER ENABLE line of the microprocessor to go to a state which will prevent initiation of subsequent transfers to memory; and said means for producing a second signal on the $\overline{\text{CMOS RAM ENABLE}}$ line of the memory includes, a second capacitor and a resistor forming a timing circuit which is responsive to the decay of the charge on the first capacitor to produce said second signal after said predetermined time.

* * * * *